Oct. 6, 1970 C. Q. LEMMOND 3,532,426

HOLOGRAPHIC FINGERPRINT INDENTIFICATION

Filed Nov. 8, 1967

Inventor :
Charles Q. Lemmond,
by Marvin Snyder
His Attorney.

United States Patent Office
3,532,426
Patented Oct. 6, 1970

3,532,426
HOLOGRAPHIC FINGERPRINT IDENTIFICATION
Charles Q. Lemmond, Scotia, N.Y., assignor to General Electric Company, a corporation of New York
Filed Nov. 8, 1967, Ser. No. 681,501
Int. Cl. G06k 9/08
U.S. Cl. 356—71 8 Claims

ABSTRACT OF THE DISCLOSURE

A system for optically correlating a fingerprint with a known one of a bank of fingerprints by making an impression in a plastic film with the finger to be identified and then comparing in coherent light the plastic film impression with holographic spatial filters of the fingerprints stored in the bank. Correlation is detected by sensing a spot of light representing the first order image.

BACKGROUND OF THE INVENTION

This invention relates to fingerprint identification and more particularly to holographic methods and apparatus for detecting correlation between a fingerprint to be identified and a known fingerprint stored in the form of a holographic spatial filter.

Fingerprints have long been utilized to identify individual persons since, so far as is known, two different persons have never been found to have identical sets of fingerprints. Moreover, it is believed that no two single fingerprints are ever exactly alike in all respects. Present methods of fingerprint recognition rely on the so-called Henry system of fingerprint classification, or variations thereof, which utilize prints of all ten fingers in making the classification. Therefore, in order to positively identify a person by his fingerprints, it has hitherto been necessary to have the prints of all ten fingers. Yet in many applications prints of less than ten fingers, or even a print of a single finger, may be all that are desirable or available. This is inadequate for recognition according to the Henry system.

The present invention is concerned with a system for fingerprint identification wherein all that is necessary in order to identify any individual person is the fingerprint from but a single finger of that person. By use of holography, correlation between the print to be identified and the stored print for that finger can be detected with a high degree of accuracy and reliability, obviating the time-consuming necessity of making ten fingerprints for each individual to be identified. This also reduces storage requirements. Furthermore, the system of the instant invention permits employment of an optical image recording medium that can be processed quickly and easily. By use of holography, moreover, the need for time-consuming and tedious manual classification, searching and identification of fingerprint records is obviated since rapid fingerprint recognition is achieved automatically. This improves the efficiency of fingerprint recognition and renders the system capable of employment in personnel identifications applications, such as credit card identification and identification for admission to areas wherein access is restricted for security.

BRIEF SUMMARY OF THE INVENTION

Accordingly, one object of the invention is to provide a fingerprint identification system wherein identification of persons may be made rapidly and to a high degree of accuracy and reliability, without need for visual comparison of fingerprints by an observer.

Another object is to provide a system capable of performing a fingerprint search operation to correlate an unidentified fingerprint with stored fingerprints immediately after an impression of the unidentified fingerprint has been made on a storage medium.

Another object is to provide a method and apparatus for personnel identification based on correlation of but a single fingerprint taken from the person to be identified.

Briefly, in accordance with a preferred embodiment of the invention, a method of correlating a fingerprint of any individual person with a bank of stored fingerprints is provided. This method comprises impressing a finger of the person upon a pliable film to create a fingerprint impression therein, and thereafter inserting the film bearing the fingerprint impression into a beam of coherent light. Spatial filters corresponding to fingerprints of known persons are then selectively inserted into the beam of coherent light emanating from the film, and the first order image produced by an inserted spatial filter is detected as an indication of correlation between the impression and the spatial filter situated in the coherent light beam.

In accordance with another embodiment of the invention, fingerprint identification apparatus is provided and comprises a plastic film, finger locator means situated adjacent to but not in contact with the plastic film, and means situated in the vicinity of the finger locator means for softening the film at that location. Means are provided for inserting the film in a beam of coherent light and for selectively inserting spatial filters made from known fingerprints into the beam of coherent light which emanates from the thermoplastic film. Photodetecting means are provided for detecting first order images produced by the coherent light emanating from the spatial filter inserted in the beam of coherent light.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF THE PREFERRED EMBODIMENTS

Figures 1, 2, 3, 4:
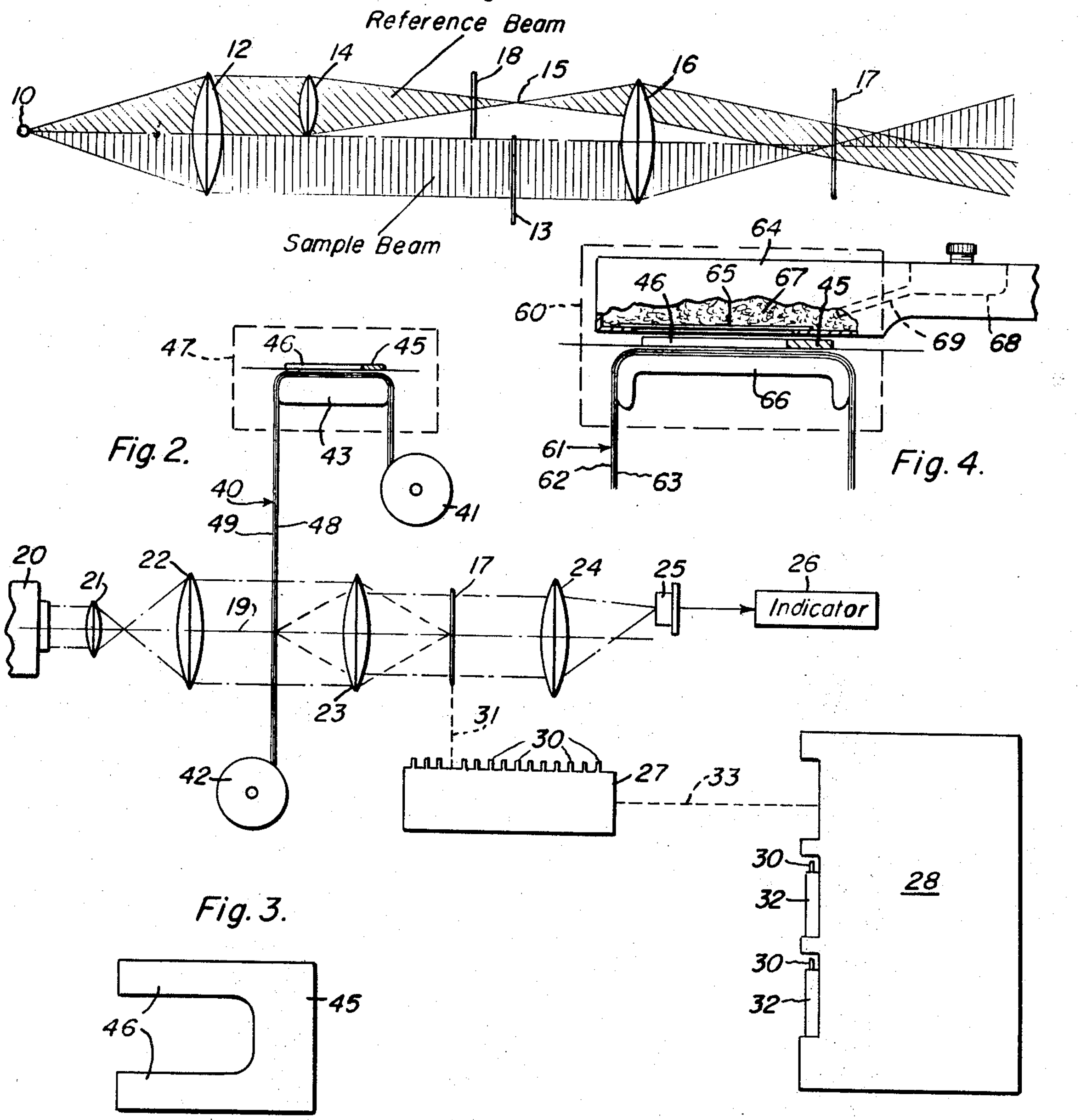
FIG. 1 is a schematic illustration of an optical system for producing a spatial filter intended for use in the system of the invention.
FIG. 2 is a schematic diagram of apparatus employed in the fingerprint identification system of the invention.
FIG. 3 is a plan view of the finger position locator illustrated apparatus of FIG. 2.
FIG. 4 is a schematic diagram of a vapor softening station for a plastic medium in which a fingerprint impression is to be made.

FIG. 1 is a schematic diagram of the optical portion of a system for fabricating holographic spatial filters suitable for use in the fingerprint identification system of the instant invention. This optical system, which is described in detail in J. M. Holeman and C. Q. Lemmond application, Ser. No. 492,187, filed Oct. 1, 1965, and J. E. Bigelow and C. Q. Lemmond application, Ser. No. 560,419, filed June 27, 1966, both of which applications are assigned to the instant assignee, generally comprises a point source of coherent light 10 preferably originating from a gas laser of conventional type, such as a commercially available helium-neon gas laser. The laser produces a collimated beam of coherent light which may be focused at the point 10 by a suitable lens (not shown) to a diameter on the order of one one-thousand of an inch or less. This focus point their becomes a point source for the system.

Light from point source 10 is incident upon a lens 12 which serves to collimate the coherent light and direct a part of it, referred to as the sample beam, onto an input plane 13. A second part of the collimated beam of coherent light is directed through a lens 14 which thereby establishes a reference beam. Transparency 13 and the focus 15 of the reference beam from lens 14 lie in the same plane perpendicular to the axis of the collimated beam. The record of the process, which becomes a holographic spatial filter, is made at the focus of a lens 16 on a recording medium illustrated at 17.

The input plane comprises a transparency of a fingerprint which may be taken from fingerprint records stored by the agency in charge of maintaining personnel records. Light transmitted through input plane transparency 13 is directed through the second lens 16 which focuses the sample beam onto recording medium 17 located at what is known as the frequency or filter plane. In addition to the sample beam, the reference beam of coherent light projected through lens 14 is also directed by lens 16 onto recording medium 17. The reference beam also may be passed through an optical attenuator 18, or through a polarizing film which may be rotated in relation to the natural polarization of the laser beam in order to effect a desired degree of optical attenuation.

After exposure in the apparatus of FIG. 1, the emulsion of recording medium 17, which may comprise any fine grain emulsion, such as type 649–F, sold by Eastman Kodak Company, Rochester, N.Y., is developed by the well-known silver photographic process, resulting in the production of a holographic spatial filter, or filter which preferentially transmits light images of predetermined shapes or sizes.

Light diffracted by transparency 13, after passing through lens 16, is combined with coherent light from the reference beam in such manner that both the amplitude and phase of the diffracted light are recorded. The amplitude primarily controls blackening of the emulsion on recording medium 17, while the phase of the diffracted light is recorded as variations in the pattern of interference with the reference beam. This recording, when photographically developed becomes what is designated a "complex spatial filter," the term "complex" meaning that the filter contains both amplitude and phase information regarding transparency 13. The recorded diffraction pattern obtained in this manner transmits coherent light which has been diffracted by another object of the same size, pattern and shape as that which produced the recorded pattern, but not by objects having other patterns. Therefore, the spatial filter constitutes a convenient device for recognizing patterns.

In FIG. 2, spatial filter 17 is shown situated in optical readout apparatus comprising a laser 20, such as a helium-neon gas laser, a widening lens 21, a pair of collimating lenses 22 and 23, and a focusing lens 24. A photosensitive device, such as a photodetecting diode 25 is situated so that the first order image, or the diffraction image immediately adjacent the optic axis 19 of the system, impinges thereon. Indicator means 26 are coupled to photodetecting means 25 so as to produce an indication of correspondence between an input image and the image on spatial filter 17. The input image is situated between collimating lenses 22 and 23, while spatial filter 17 is situated between collimating lens 23 and focusing lens 24.

Spatial filter 17 is selected from a spatial filter storage means 27 such as a slide carriage box which, in turn, is selected from spatial filter storage bin 28. Selection of spatial filter 17 from among a plurality of spatial filters 30 in storage means 27 is preferably performed by mechanical selection apparatus 31 which removes the selected spatial filter from the storage means. Similarly, selection of spatial filter storage means 27 from among a plurality of slide carriage boxes or other forms of spatial filter storage means 32 in bin 28 is preferably accomplished by mechanical means 33. Nevertheless, while filter 17 and storage means 27 may be withdrawn by mechanical means 31 and 33, respectively, selection of spatial filter 17 from among spatial filters 30 and selection of spatial filter storage means 27 from among spatial filter storage means 32 may be made manually if desired.

The input images, which is a fingerprint impression formed in a thermoplastic film on a tape 40, is inserted between lenses 22 and 23. The image may be transported through the beam of coherent light produced by laser 20 by conveying the tape from a pay-out reel 41 to a takeup reel 42. A heater 43 is situated at a fingerprint impression station 47 which comprises a finger position locator 45 situated closely adjacent to, but not in contact with, the thermoplastic film on tape 40 at heater 43. The heater warms the thermoplastic film in the vicinity of fingerprint impression station 47 to a temperature of about 40° C., which is sufficiently high to soften the film and hence permit impression of a fingerprint to be made in the film by depressing the finger thereon. Finger locator 45 is illustrated in plan view in FIG. 3, and is seen to comprise a pair of guides 46 intended to extend along either side of the finger being depressed on the thermoplastic film on tape 40 of FIG. 2 so as to ensure not only that the impression is made in the proper location on the thermoplastic film, but also that the impression is made with the proper angular orientation in order to obviate any necessity of requiring a rotational scan for alignment of spatial filter 17. After the portion of the thermoplastic film in which the impression has been made is moved away from station 47, the film cools sufficiently to retain the impression without danger of loss even if the film should be squeezed under pressure on takeup reel 42. Motion of reels 41 and 42 if preferably controlled by the operator of the fingerprinting apparatus at station 47.

Typically, tape 40 is a dual layer tape comprising a substrate or base 48, coated with a layer or film 49 of thermoplastic material. For example, the substrate or base material of tape 40 must be optically clear, smooth, and solid at temperatures substantially above the temperature at which the thermoplastic surface becomes liquid. The base strip is typically of four mils thickness and may be comprised of an optical grade of polyethylene terephthalate, sold under the name of Cronar. Mylar is also suitable. The thermoplastic layer of the tape must similarly be optically clear, and must have a substantially infinite viscosity at temperatures to which the recording medium may be subjected when in storage. It must also soften to a liquid of sufficiently low viscosity at the temperature to which it is heated for receiving an impression, which is typically about 40° C. The thickness of the thermoplastic layer is preferably about one micron, in order to prevent the recorded grooves from exceeding one micron in depth. This avoids phase-difference noise which would otherwise arise due to differences from one impression to another in depth of penetration of the thermoplastic layer by ridges on the skin. Typical compositions for the thermoplastic layer on tape 40 are described in detail in W. E. Glenn, Jr., Pat. No. 3,113,179, issued Dec. 3, 1963, and assigned to the instant assignee.

In operation, a person whose identity is to be established places a finger which is selected to be a predetermined one on a particular hand, such as the left thumb, between guides 46 on finger locator 45 and presses the finger with sufficient force to form an impression in a softened portion of thermoplastic film 49 on tape 40. When a fingerprint impression has thus been made on tape 40, the film is advanced by reels 42 and 41 into the beam of coherent light produced by laser 20. This provides sufficient time for the thermoplastic film to have cooled to room tempertaure by the time the impression enters the beam of coherent light. A group of spatial filters, which may be mounted in slide carriage boxes for rapid transport into the system, is then selected either manually, or preferably by mechanical means and the appropriate spatial filter is then moved into position in the beam of coherent light. Alternatively, the spatial filters could be stored on a roll of film with the film being indexed so as to indicate filter location and facilitate rapid selection of individual filters.

With the fingerprint impression in the input plane of the optical apparatus shown in FIG. 2 and a selected spatial filter 17 situated between lenses 23 and 24, the spatial filter transmits a light diffraction pattern in accordance with the impression on tape 40. Any coherent light transmitted by spatial filter 17 is imaged by lens 24 onto photodetector 25. Thus, in the event of correlation between the image on tape 40 in the beam of coherent light and the diffraction image on spatial filter 17, light passes from spatial filter 17 to photodetector 25, which is situated in the focal plane of lens 24 at the location of the first order image. Upon detection of a bright spot of light in the focal plane of lens 24 at the first order image location, indicator 26 produces any desired form of indication such as audible, visual, or electrical. A typical situation in which this type of identification would be utilized is that where persons whose identity may be questionable desire to gain access to a restricted security area. With fingerprints of those people who have been cleared for access to the area being stored in the form of spatial filters, anyone purporting to be one of the cleared persons may be positively identified as being that person or not being that person in a matter of seconds merely by comparing the impression of his fingerprint with the spatial filter of the fingerprint associated with the person whom the unidentified person purports to be. Correlation between the fingerprint and the spatial filter may be utilized to open a gate and allow access to the restricted security area to the person whose fingerprint impression has been taken, while lack of correspondence between the fingerprint and the spatial filter may be used to trigger an alarm.

In FIG. 4, a fingerprint impression station 60, which may be utilized instead of station 47 in the apparatus of FIG. 2, is illustrated. Station 60 differs from station 40 in that softening of a plastic film 62 on tape 61 in which the fingerprint impression is to be made is performed by the action of solvent vapors from a solvent source 64. Solvent source 64, shown partially broken away contains a wad of absorbent material 67, such as cotton or cheesecloth for example, positioned over a shutter 65. Source 64 may be swiveled at a pivot point (not shown) to facilitate being positioned over finger locator 45. The wad of absorbent material is preferably kept in contact with a reservoir 68 of solvent within enclosure 64 through a tube 69. The solvent may typically comprise toluene, although xylene or benzene is also suitable.

In order for film 62 on tape 61 to soften in the presence of toluene vapor, the composition of plastic surface layer 62 must comprise a solid composition such as silicone-poly(phenylene oxide), while the base layer 63 of tape 61, which is optically clear, smooth and flat, and nonreactive in the presence of the solvent vapors, is typically comprised of an optical grade of polyethylene terephthalate, sold under the name of Cronar. Mylar, Lexan, and cellulose acetate are also suitable materials for the base layer. Tape 61 is supported on a smooth slide 66.

Prior to recording a fingerprint on tape 61, enclosure 64 is positioned directly over the region of tape bounded by guides 46 of finger locator 45. Shutter 65 is then opened for about 2 or 3 seconds, permitting the solvent vapors to contact plastic surface layer 62 of tape 61. These vapors soften the plastic surface layer, converting it to a viscous liquid. Shutter 65 is then closed and enclosure 64 moved away from finger locator 45, permitting the person to be identified to press his finger momentarily onto surface layer 62. After about 10 seconds, enough solvent will have evaporated from layer 62 to harden the layer and freeze the impression which was made when layer 62 was soft. Tape 61 is then advanced to transport the impression into the coherent light beam, and the recognition process takes place as described for the system of FIG. 2. The impression as thus made exhibits the high quality archival characteristic which accompanies high softening temperatures.

Still another method of establishing a fingerprint impression in a plastic film involves depressing the finger on a film of plasticized polystyrene coated on a conductive film deposited on a substrate of material as previously described, and thereafter subjecting the plastic film to an electrical corona discharge. Subsequent heating of the film results in a distortion of the surface thereof in accordance with the pattern of ridges and grooves on the skin of the finger which had been depressed on the film. If the film is then cooled, the fingerprint impression becomes frozen in the film.

Figure 5:
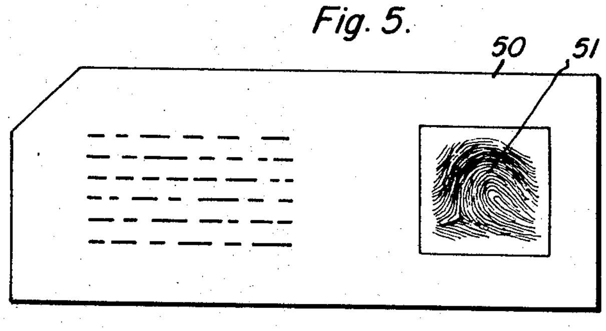
FIG. 5 is an illustration of a form of fingerprint recording medium used as an alternative to the recording medium illustrated in FIG. 2.

FIG. 5 illustrates an alternative form of fingerprint recording medium comprising a statistical record card 50 having an apertured region therein with a sheet 51 of transparent thermoplastic film on an optically clear, smooth base which may be comprised of Mylar, mounted in the aperture. This card is machine classificable, and may also be utilized for recording printed information pertaining to the individual whose fingerprint is stored in the thermoplastic film 51. To record the fingerprint, it is merely necessary to warm the thermoplastic film to a temperature sufficient to allow the thermoplastic material to become a viscous liquid and form the fingerprint impression by depressing the finger upon the thermoplastic film. The film is then allowed to cool so as to freeze the impression. The card can then be inserted by hand or by machine in the path of coherent light produced by laser 20, shown in FIG. 2, instead of tape 40. Detection of correlation between the fingerprint in the thermoplastic film 51 and the image on spatial filter 17 is thereafter performed in a manner similar to that previously described. Moreover, information may be recorded on card 50 in the form of punched holes therein, enabling the card to perform the dual function of storing the fingerprint impression of an individual person together with data regarding the person, and providing facility for rapid retrieval of all this information from storage by machine.

In the alternative, a plastic film such as silicone-poly(phenylene oxide) may be coated over the base in the apertured region of card 50, and the film may be subjected to vapor softening by inserting the card momentarily into an enclosure filled with vapors of a solvent such as toluene. The card may then be removed from the enclosure and a fingerprint impression made immediately on the softened plastic film. After about ten seconds, the plastic film will have hardened sufficiently to freeze the impression therein.

The system of the instant invention also provides facility for searching fingerprint records automatically. This may be accomplished by comparing the impression of the fingerprint to be identified with basic patterns of fingerprints as made from an artist's drawings. Thus, since fingerprints are presently classified in general according to three major categories which comprise the arch, the loop, the the whorl, a general category for the unknown fingerprint may be selected. Once the general category has been selected, the spatial filters corresponding to fingerprints in that category may then be searched by inserting, one at a time, spatial filters of fingerprints into the beam of coherent light until correlation is achieved. Moreover, by dividing each of the major categories of loops, whorls, and arches into subcategories, including composite categories, with each subcategory being represented by the spatial filter made from an artist's drawing search time may be further diminished by narrowing the number of spatial filters to be searched.

The foregoing describes a fingerprint identification system wherein identification of persons may be rapidly established with a high degree of accuracy and reliability, without need for visual comparison of fingerprints by an observer. The system is capable of initiating a fingerprint search operation to correlate an unidentified fingerprint with spatial filters of stored fingerprints immediately after an impression of the unidentified fingerprint has been made on a storage medium, thus providing a method and apparatus for personnel identification based on correlation of but a single fingerprint taken from the person to be identified.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. A method of establishing identity of a person by correlating a fingerprint of the person with a bank of stored fingerprints comprising the steps of:
impressing a finger of the person upon a pliable film to create a fingerprint impression therein;
inserting said film bearing the fingerprint impression into a beam of coherent light;
selectively inserting spatial filters corresponding to fingerprints of known persons into the beam of coherent light emanating from said film; and
detecting the first order image produced by one of said spatial filters inserted in said beam of coherent light as an indication of correlation between said impression and the inserted spatial filter.

2. A method of establishing identity of a person by correlating a fingerprint of the person with a bank of stored fingerprints comprising the steps of:
heating a thermoplastic film to a temperature of at least 40° C. so as to soften said film;
impressing a finger of the person upon said softened thermoplastic film to create a fingerprint impression therein;
cooling said thermoplastic film to room temperature so as to retain said fingerprint impression in said thermoplastic film;
inserting said film bearing the fingerprint impression into a beam of coherent light;
selectively inserting spatial filters corresponding to fingerprints of known persons into the beam of coherent light emanating from said film; and
detecting the first order image produced by one of said spatial filters in said beam of coherent light as an indication of correlation between said impression and said one of said spatial filters.

3. A method of establishing identity of a person by correlating a fingerprint of the person with a bank of stored fingerprints comprising the steps of:
exposing a film of silicon-poly(phenylene oxide) to solvent vapor for said film so as to soften said film;
impressing a finger of the person upon the softened film so as to create a fingerprint impression therein;
permitting remnants of said vapor to evaporate from said thermoplastic film;
inserting said film bearing the fingerprint impression into a beam of coherent light;

selectively inserting spatial filters corresponding to fingerprints of known persons into the beam of coherent light emanating from said film; and
detecting the first order image produced by one of said spatial filters in said beam of coherent light as an indication of correlation between said impression and said one of said spatial filters.

4. A method of correlating a surface bearing a three-dimensional pattern thereon with a selected one of a bank of spatial filters representing patterns expected to be presented for recognition comprising the steps of:
impressing said surface upon a pliable film to create an impression of said surface therein;
directing a beam of coherent light toward the portion of said film bearing the impression of said surface;
selectively inserting the spatial filters of said bank into the beam of coherent light emanating from said film; and
detecting the first order image produced by one of said spatial filters inserted in said beam of coherent light as an indication of correlation between said impression and the inserted spatial filter.

5. Fingerprint identification apparatus comprising: a plastic film; finger-locator means situated adjacent to but not in contact with the surface of said plastic film; means for softening said film at said finger locator means location; means for inserting said film in a beam of coherent light; means for selectively inserting spatial filters into said beam of coherent light emanating from said plastic film; and photodetecting means for detecting first order images produced by the coherent light emanating from the spatial filter inserted in said beam of coherent light.

6. The fingerprint identification apparatus of claim 5 wherein said means for inserting said film in a beam of coherent light comprises film transport means for conveying said film through said beam of coherent light.

7. The fingerprint identification apparatus of claim 5 wherein said plastic film comprises a thermoplastic material and said means for softening said film at said finger locator means location comprises a heater.

8. The fingerprint identification apparatus of claim 5 wherein said means for softening said film at said finger locator means comprises means dispensing a solvent for said film.

References Cited

UNITED STATES PATENTS

| | | | |
|---|---|---|---|
| 2,020,376 | 11/1935 | Rich | 118—31.5 |
| 2,936,607 | 5/1960 | Nielsen | 356—71 |
| 3,200,701 | 8/1965 | White | 356—164 |

OTHER REFERENCES

Horvath et al.: "Holographic Technique Recognizes Fingerprint," Laser Focus, June 1967, pp. 18–23.

RONALD L. WIBERT, Primary Examiner

J. ROTHENBERG, Assistant Examiner

U.S. Cl. X.R.

350—162; 356—156